United States Patent
Alismail

(10) Patent No.: US 12,319,246 B2
(45) Date of Patent: Jun. 3, 2025

(54) SYSTEMS AND METHODS FOR VEHICLE CAMERA OBSTRUCTION DETECTION

(71) Applicant: FORD GLOBAL TECHNOLOGIES, LLC, Dearborn, MI (US)

(72) Inventor: Hatem Alismail, Pittsburgh, PA (US)

(73) Assignee: Ford Global Technologies, LLC, Dearborn, MI (US)

( * ) Notice: Subject to any disclaimer, the term of this patent is extended or adjusted under 35 U.S.C. 154(b) by 914 days.

(21) Appl. No.: 17/411,403

(22) Filed: Aug. 25, 2021

(65) Prior Publication Data

US 2023/0068848 A1 Mar. 2, 2023

(51) Int. Cl.
| | |
|---|---|
| *B60S 1/56* | (2006.01) |
| *B60R 11/04* | (2006.01) |
| *G06T 7/11* | (2017.01) |
| *G06V 10/25* | (2022.01) |
| *G06V 10/80* | (2022.01) |
| *G06V 20/56* | (2022.01) |

(52) U.S. Cl.
CPC ............... *B60S 1/566* (2013.01); *G06T 7/11* (2017.01); *G06V 10/25* (2022.01); *G06V 10/809* (2022.01); *G06V 20/56* (2022.01); *B60R 11/04* (2013.01); *G06T 2207/20104* (2013.01)

(58) Field of Classification Search
CPC .. B60S 1/566; G06T 7/11; G06T 2207/20104; G06V 10/25; G06V 10/809; G06V 20/56; B60R 11/04
See application file for complete search history.

(56) References Cited

U.S. PATENT DOCUMENTS

| | | | | |
|---|---|---|---|---|
| 8,705,134 | B2 * | 4/2014 | Campanelli | G06T 7/194 |
| | | | | 358/463 |
| 9,230,302 | B1 | 1/2016 | Owechko et al. | |
| 9,848,173 | B1 * | 12/2017 | Pertsel | H04N 7/181 |
| 10,134,139 | B2 * | 11/2018 | Gulati | G06T 7/001 |

(Continued)

FOREIGN PATENT DOCUMENTS

| | | |
|---|---|---|
| EP | 3489892 A1 | 5/2019 |
| EP | 3149656 B1 | 1/2020 |

OTHER PUBLICATIONS

Extended European Search Report dated Feb. 7, 2023 for EP Application No. 22191861.8, 9 pags.

*Primary Examiner* — Mia M Thomas
(74) *Attorney, Agent, or Firm* — Frank A. MacKenzie; Brooks Kushman P.C.

(57) ABSTRACT

A system such as an autonomous vehicle's perception system will identify and classify an obstruction in a field of view of an image capturing device. The system will receive a sequence of image frames from the image capturing device. For each of the image frames, the system will segment the image frame into a regions of interest (ROIs), and the system will use a classifier to assign a classification to each ROI. The classification indicates whether the ROI is clear or obstructed. The system will aggregate the classifications for each ROI to determine an aggregate classification. When an obstructed classification persists for a threshold number of image frames, the system will classify the image capturing device as obstructed, and it will generate a function request that, when executed, will cause a system of which the image capturing device is a component to perform a function.

18 Claims, 9 Drawing Sheets

(56) References Cited

U.S. PATENT DOCUMENTS

| | | | |
|---|---|---|---|
| 10,511,676 B2* | 12/2019 | Howe | G06T 7/0004 |
| 2007/0115357 A1* | 5/2007 | Stein | B60S 1/0844 |
| | | | 348/148 |
| 2016/0162740 A1* | 6/2016 | Takemura | H04N 23/95 |
| | | | 348/148 |
| 2019/0041849 A1 | 2/2019 | Kida et al. | |
| 2019/0068829 A1* | 2/2019 | Van Schoyck | G05D 1/101 |
| 2019/0106085 A1* | 4/2019 | Bacchus | G02B 27/0006 |
| 2020/0012838 A1 | 1/2020 | Sharma et al. | |
| 2020/0045260 A1* | 2/2020 | Averhart | H04N 5/44504 |
| 2021/0192745 A1 | 6/2021 | Kahlbaum | |
| 2021/0287013 A1* | 9/2021 | Carter | G06F 18/24 |
| 2022/0027406 A1* | 1/2022 | Gredley | G06F 16/583 |
| 2023/0027627 A1* | 1/2023 | Schmitt | G06V 10/26 |

* cited by examiner

SYSTEMS AND METHODS FOR VEHICLE CAMERA OBSTRUCTION DETECTION

BACKGROUND

The present disclosure relates to methods and systems for determining when the field of view of a camera of an autonomous vehicle (AV) is obstructed.

Recent advancements in artificial intelligence (AI) have made cameras integral to the deployment of many autonomous systems such as AVs. Cameras enable AVs and other vehicles to capture images of the environment around the vehicle and perceive objects in the environment. However, the accuracy of any sensor-based perception data depends on the integrity of the sensor data. Maintaining this integrity, especially in autonomous driving scenarios where systems must perform robustly across various environmental conditions, can be challenging if the quality of sensor data is degraded.

The causes for camera image quality degradation can range from hardware failures to environmental effects, such as environmental obstructions caused on dirt, debris or other materials that the vehicle encounters as it moves in the environment. These obstructions can cause various degrees of image quality degradation which, in turn, can affect the overall functionality of the cameras.

For at least these reasons, systems and methods for identifying environmental obstructions of AV cameras, and performing actions to address these environmental obstructions, are needed.

SUMMARY

In various embodiments, a system such as an autonomous vehicle's perception system will identify and classify an obstruction in a field of view of an image capturing device. The system will receive a first sequence of image frames, wherein each image frame represents a field of view of the image capturing device. For each of the image frames in the first sequence, the system will segment the image frame into a plurality of regions of interest (ROIs), and the system will use a classifier to assign a classification to each ROI. The classification indicates whether the ROI is clear or obstructed. The system will aggregate the classifications for each ROI to determine an aggregate classification for each ROI. When an obstructed classification persists for a threshold number of image frames, the system will classify the image capturing device as obstructed, and it will generate a function request that, when executed, will cause a system of which the image capturing device is a component to perform a function.

Optionally function request may include one or more of the following: (a) a command to trigger a cleaning cycle that will cause a cleaning system to direct air or water toward the image capturing device to clean the image capturing device; or (b) a command to trigger a cleaning cycle that will cause a cleaning system to wipe image capturing device to clean the image capturing device. When the image capturing device is a component of an autonomous vehicle, the function request may include a command to perform one or more of the following: (i) cause a motion planning system of the vehicle to move to a parking location; or (ii) alert a human operator to take over operation of the autonomous vehicle.

In some embodiments, the system may generate a confidence score for the aggregate classification. The system may then classify the image capturing device as obstructed and generating the function request is also responsive to the confidence score for the aggregate classification exceeding a threshold. When generating the confidence score, the system may generate a score that is a function of one or more of the following: (a) a number of the image frames in the sequence in which the obstruction was detected; (b) a number of spatially adjacent ROIs that were classified as obstructed; or (c) a location within the image frames at which obstructed ROIs were positioned.

Optionally, when classifying the image capturing device as obstructed, the system may classify an obstruction in the image frames as either a translucent obstruction or an opaque obstruction.

In some embodiments, for each of the image frames in the first sequence, the system may use the classifier to assign an obstruction type to each ROI which the classifier identifies as obstructed. Then, when generating the function request, the system may select a command that corresponds to the obstruction type, and it may include the selected command in the function request.

In some embodiments, when the region of interest for the series of image frames is not classified as an obstruction, the system may continue to receive additional image frames, segment each additional image frame into additional ROIs, use the classifier to assign an additional classification to each additional ROI, and aggregate the additional classifications until an obstructed classification persists for the threshold number of image frames.

DETAILED DESCRIPTION

Figure 1:
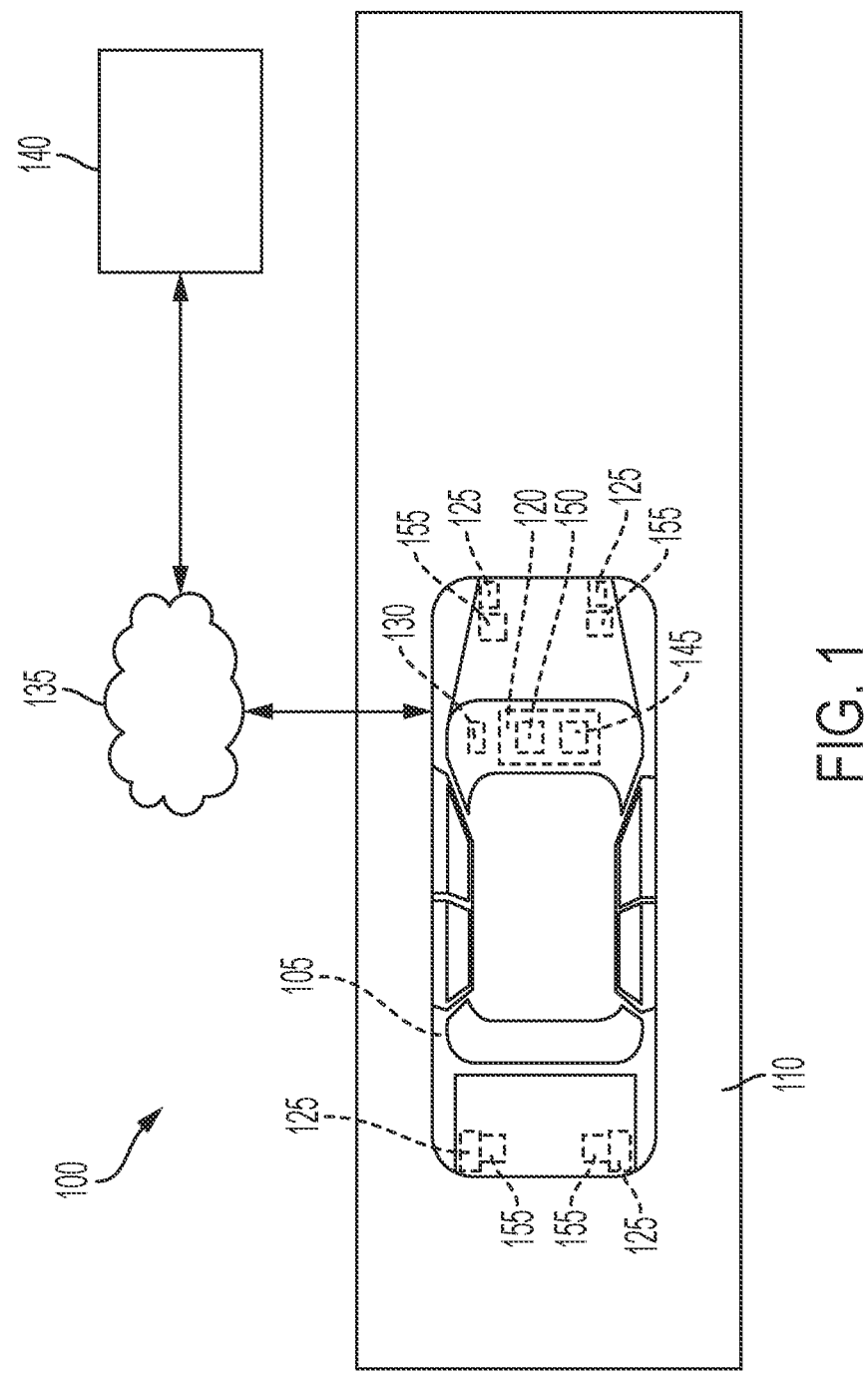
FIG. 1 is an example of a vehicle that is equipped with cameras, as well as a system for determining when any of the cameras are obstructed, according to various embodiments of the present disclosure.

As used in this document, the singular forms "a," "an," and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to."

An "electronic device" or a "computing device" refers to a device that includes a processor and memory. Each device may have its own processor and/or memory, or the processor and/or memory may be shared with other devices as in a virtual machine or container arrangement. The memory will contain or receive programming instructions that, when executed by the processor, cause the electronic device to perform one or more operations according to the programming instructions.

The terms "memory," "memory device," "computer-readable storage medium," "data store," "data storage facility" and the like each refer to a non-transitory device on which computer-readable data, programming instructions or both are stored. Except where specifically stated otherwise, the terms "memory," "memory device," "computer-readable storage medium," "data store," "data storage facility" and the like are intended to include single device embodiments, embodiments in which multiple memory devices together or collectively store a set of data or instructions, as well as individual sectors within such devices.

The terms "processor" and "processing device" refer to a hardware component of an electronic device that is configured to execute programming instructions. Except where specifically stated otherwise, the singular term "processor" or "processing device" is intended to include both single-processing device embodiments and embodiments in which multiple processing devices together or collectively perform a process.

The term "module" refers to a set of computer-readable programming instructions, as executed by a processor, that cause the processor to perform a specified function.

The term "vehicle" refers to any moving form of conveyance that is capable of carrying either one or more human occupants and/or cargo and is powered by any form of energy. The term "vehicle" includes, but is not limited to, cars, trucks, vans, trains, autonomous vehicles, aircraft, aerial drones and the like. An "autonomous vehicle" (AV) is a vehicle having a processor, programming instructions and drivetrain components that are controllable by the processor without requiring a human operator. An AV may be fully autonomous in that it does not require a human operator for most or all driving conditions and functions, or it may be semi-autonomous in that a human operator may be required in certain conditions or for certain operations, or that a human operator may override the vehicle's autonomous system and may take control of the vehicle.

In this document, when terms such as "first" and "second" are used to modify a noun, such use is simply intended to distinguish one item from another, and is not intended to require a sequential order unless specifically stated. In addition, terms of relative position such as "vertical" and "horizontal", or "front" and "rear", when used, are intended to be relative to each other and need not be absolute, and only refer to one possible position of the device associated with those terms depending on the device's orientation.

As used in this document, the term "classifier" means an automated process by which an artificial intelligence system may assign a label or category to one or more data points. A classifier includes an algorithm that is trained via an automated process such as machine learning. A classifier typically starts with a set of labeled or unlabeled training data and applies one or more algorithms to detect one or more features and/or patterns within data that correspond to various labels or classes. The algorithms may include, without limitation, those as simple as decision trees, as complex as Naïve Bayes classification, and/or intermediate algorithms such as k-nearest neighbor. Classifiers may include artificial neural networks (ANNs), support vector machine classifiers, and/or any of a host of different types of classifiers. Once trained, the classifier may then classify new data points using the knowledge base that it learned during training. The process of training a classifier can evolve over time, as classifiers may be periodically trained on updated data, and they may learn from being provided information about data that they may have mis-classified. A classifier will be implemented by a processor executing programming instructions, and it may operate on large data sets such as image data, light detection and ranging (LIDAR) roisystem data, and/or other data.

As used in this document, the phrases "machine learning model" and "model" refer to a set of algorithmic routines and parameters that can predict an output(s) of a real-world process (e.g., prediction of an object trajectory, a diagnosis or treatment of a patient, a suitable recommendation based on a user search query, etc.) based on a set of input features, without being explicitly programmed. A structure of the software routines (e.g., number of subroutines and relation between them) and/or the values of the parameters can be determined in a training process, which can use actual results of the real-world process that is being modeled. Such systems or models are understood to be necessarily rooted in computer technology, and in fact, cannot be implemented or even exist in the absence of computing technology. While machine learning systems utilize various types of statistical analyses, machine learning systems are distinguished from statistical analyses by virtue of the ability to learn without explicit programming and being rooted in computer technology.

Referring now to FIG. 1, a system 100 for determining when a vehicle camera is obstructed is illustratively depicted, in accordance with various embodiments of the present disclosure.

According to various embodiments, the system 100 includes a vehicle 105 (e.g., an AV or other type of vehicle). As shown in FIG. 1, the vehicle 105 is traveling on a road 110. It is noted, however, that any suitable path for the vehicle 105, if any, may be implemented. According to various embodiments, the vehicle 105 may be stationary or moving.

The vehicle 105 includes one or more image capturing devices 125 (e.g., cameras), each having a field of view. The image capturing devices 125 are configured to capture one or more images of an environment within their field of view. According to various embodiments, the image capturing devices 125 can be positioned at any suitable location on or within the vehicle 105, such as, for example, the front, rear, and/or sides of the vehicle 105 and/or any other suitable position or positions. Optionally, the image capturing devices 125 may include one or more pairs of stereo cameras.

Figure 2A:
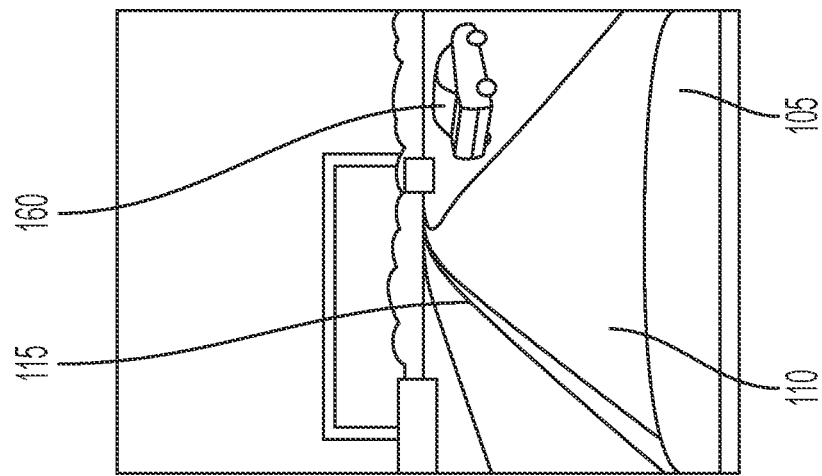
FIG. 2A is an example clear field of view of an image capturing device, according to various embodiments of the present disclosure.
Figure 2B:
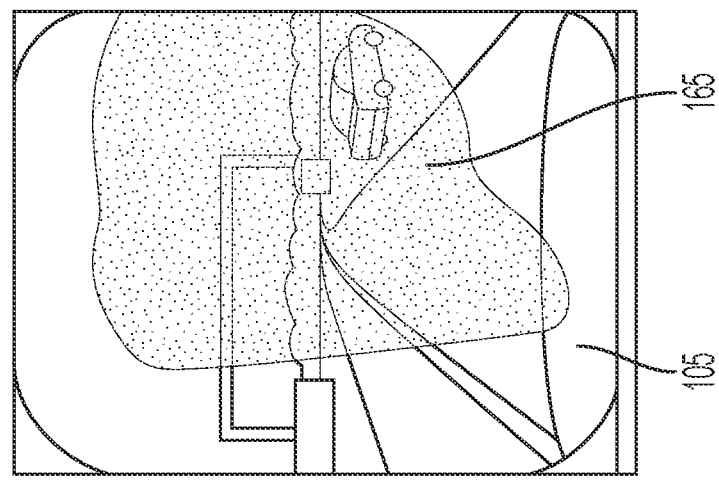
FIG. 2B is an example of a field of view of an image capturing device with a translucent obstruction, according to various embodiments of the present disclosure.
Figure 2C:
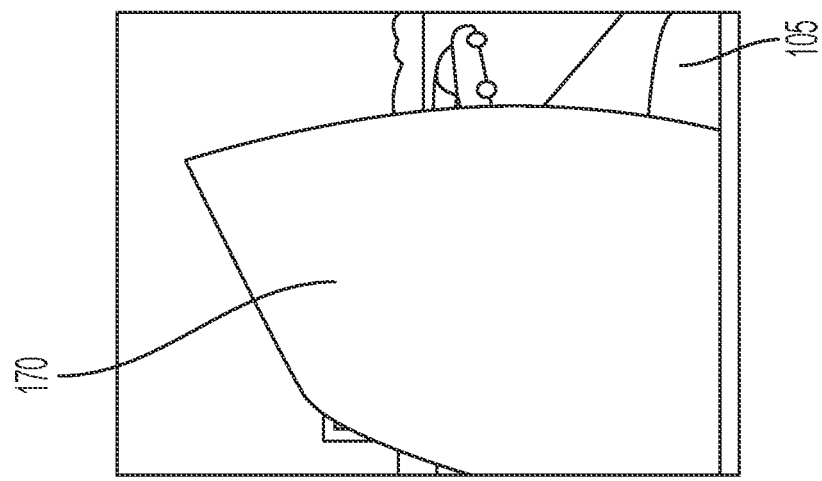
FIG. 2C is an example of a field of view of an image capturing device with an opaque obstruction, according to various embodiments of the present disclosure.

Ideally, the images captured by an image capturing device 125 will be clear and absent any obstructions. Some obstructions may be transient, in that they only interfere with image quality for a brief period of time. Transient obstructions may be caused by, for example, sudden lighting changes or items passing by the image capturing device. Persistent obstructions are those that persist over a period of time such that device will be degraded if an action is not taken to remove the obstruction from the device. This document uses the term "environmental obstruction" to refer to an environmentally induced, persistent obstruction that causes an actionable, persistent degradation of image quality. A clear image, absent any environmental obstructions, enables relevant factors of the environment within the field of view of the image capturing device 125 to be visible. For example, in the clear image shown in FIG. 2A, the AV 105, the road 110, road lane marker lines 115, and one or more objects (e.g., car 160) are visible. As opposed to a clear view, an obstructed view may have one or more environmental factors partially or entirely obstructed from the field of view of the image capturing device 125. Environmental obstructions may cause various levels of interference and may range from translucent obstructions (such as interference caused by persistent rain droplets) to opaque obstructions (such as interference caused by a clump of dirt). A translucent obstruction is at least partially transparent, enabling at least some light to pass through the obstruction. FIG. 2B shows an example of a translucent obstruction 165 within the field of view of an image capturing device 125. In FIG. 2B, the vehicle 105 and road 110 are still partially visible, but the details of each element of the image are not easy to discern. An opaque obstruction blocks all, or nearly all, light from passing through the obstruction. FIG. 2C shows an example of an opaque obstruction 170 within the field of view of an image capturing device 125.

Referring back to FIG. 1, in order to accurately detect and address environmental obstructions present in the fields of view of the image capturing devices 125, as noted above, one or more computing devices 120 of the AV may include an obstruction detection module that is configured to configured to receive and process image data generated by each of the image capturing devices 125. According to various embodiments, the image capturing devices 125 may include one or more cameras. As an alternative to cameras, one or more RADAR systems, one or more LIDAR systems, and/or one or more other suitable sensors of a vehicle's perception system may be considered to be image capturing devices 125 in this disclosure, and the system may detect environmental obstructions on all such sensors.

The vehicle 105 may include a transceiver 130 configured to send and/or receive digital information from a remote server 140 via a wired and/or wireless connection such as, for example, through a wireless communication network 135, wherein the vehicle 105 and the remote server 140 are in electronic communication with each other. The system may include a processor 145. It is noted that the processor 145 may be a standalone processor, a component of the vehicle's computing devices 120, and/or a component of the remote server 140. Data processed by the processor 145 may be data received from the vehicle 105, data received from the remote server 140, and/or a combination of data received from the vehicle 105 and the remote server 140. According to various embodiments, the computing device 120 may include one or more digital storage devices 150, and/or some or all of the digital information may be stored locally at the vehicle 105.

According to various embodiments, the one or more digital storage devices 150 include programming instructions that, when executed, cause the processor 145 to analyze one or more images captured by the one or more image capturing device 125 to determine whether an environmental obstruction exists and, if such environmental obstruction exists, cause the vehicle 105 to perform a function. The function may include, e.g., triggering a cleaning cycle, altering a trajectory of the vehicle 105, altering a speed of the vehicle 105, generating a notification (e.g., a visual and/or audible notification) that an environmental obstruction has been detected, generating a notification (e.g., a visual and/or audible notification) that a function is being performed in response to the detection of an environmental obstruction, and/or other suitable functions.

According to various embodiments, the vehicle 105 may include cleaning system 155 that may, in response to a command from the obstruction detection module, implement the cleaning cycle. According to various embodiments, when the cleaning system 155 implements a cleaning cycle it will remove all or part of one or more obstructions from one or more image capturing devices 125. The cleaning system may include one or more active or passive air conveying devices such as a fans configured to direct air onto the image capturing device to dislodge an environmental obstruction from the image capturing device, one or more wiper blades configured to physically wipe an obstruction from an image capturing device, a water and/or cleaning fluid dispenser configured to direct water and/or cleaning fluid onto the image capturing device to dislodge the obstruction, a combination of any of the above, and/or any other suitable form of cleaning apparatus.

Figure 3:
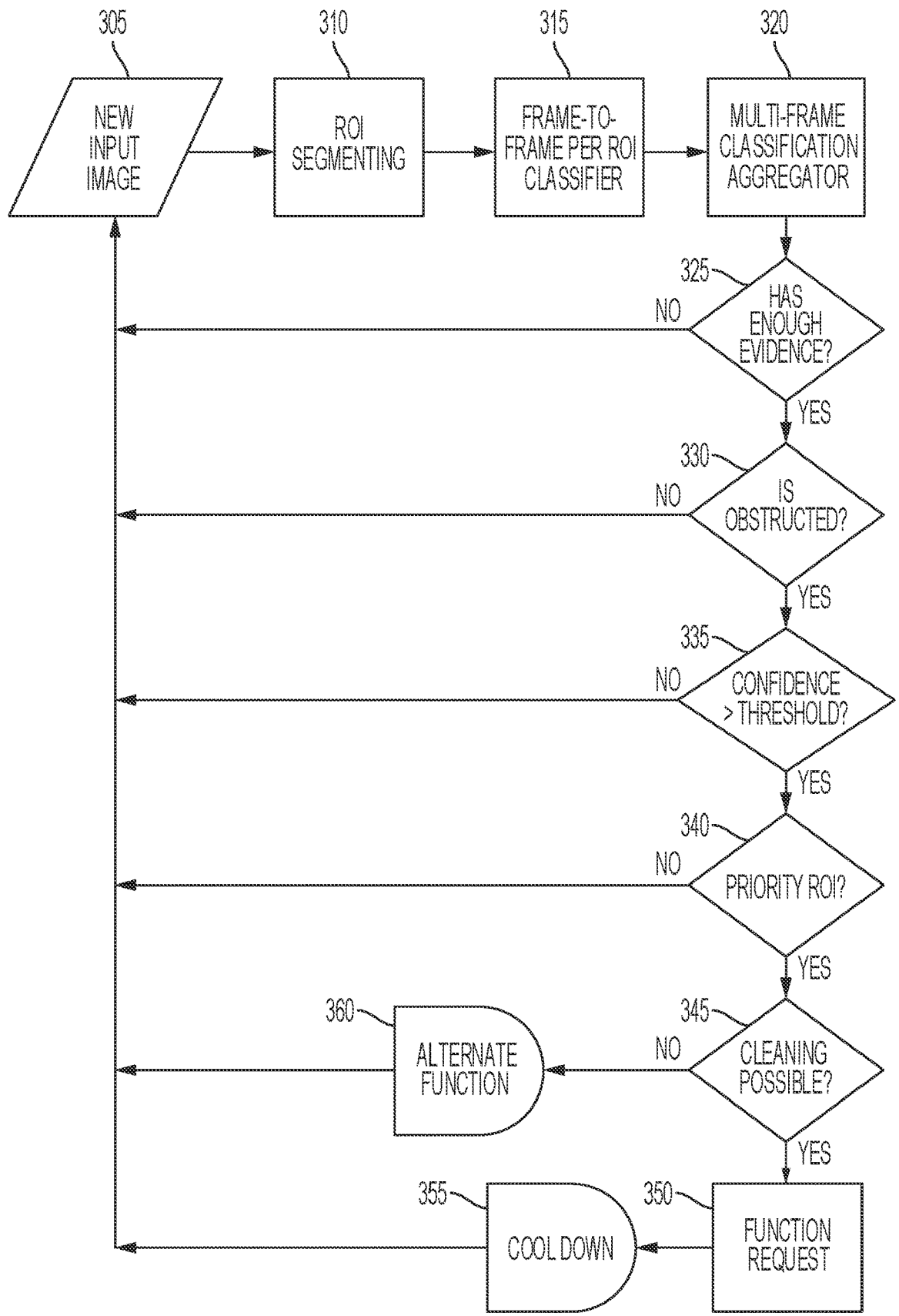
FIG. 3 is an example of processing blocks of an obstruction detection module, according to various embodiments of the present disclosure.

Referring now to FIG. 3, a process by which the obstruction detection module may process images to identify obstructions are illustratively depicted, in accordance with various embodiments of the present disclosure. At 305 the obstruction detection module receives an input image frame that was captured a camera or other sensor of a system such an AV. The image will show features of the field of view of the sensor. At 310 the obstruction detection module will segment the frame into a set of regions of interest (ROIs). For example, referring to FIG. 4, the module may segment an example image frame 400 into a non-overlapping grid of ROIs 405. In an image having a resolution of 300×400, the grid may be a 4×5 grid with 64 pixels per ROI. However, the grid may be segmented into more or fewer ROIs, with different levels of resolution. The module will then input each ROI of the image frame into a trained classifier, and at 315 the classifier will process the ROI to determine whether an obstruction feature is present in the ROI. According to various embodiments, the classifier will be a model that was trained based on supervised learning of histogrammed intensity and color-derived filter responses from a set of non-overlapping ROIs of multiple image frames. According to various embodiments, the obstruction classifier will classify each ROI as clear or obstructed, such as with labels according to one of the following classes:

Clear: no obstructions are present within the ROI;

Obstructed—translucent: an obstruction is present within the ROI, and the obstruction is translucent (e.g., smudges on the lens) such that some light can reach the sensor through the obstruction but the scene is not sharp enough to be considered clear; or Obstructed—opaque: an obstruction is present within the ROI, and the obstruction is opaque, blocking a significant amount of light in the ROI. With no or negligible light being sensed by the image capturing device through the obstruction, the image capturing device may be significantly impaired by an opaque obstruction.

The labels output by the classifier need not be the precise words described above, but instead may be any label that distinguishes a clear ROI from an obstructed ROI, and opaque obstructions from translucent obstructions. When this document uses the terms "clear", "translucent' and "opaque" it is intended to include any label representing such varying degrees of obstruction.

According to various embodiments, the obstruction detection module may generate a confidence score for each possible label in an ROI. For example, the system may measure a model score for each class as the distance of the feature vector of the proposed class from a separating hyperplane of each class.

According to various embodiments, at 320 the obstruction detection module will aggregate the per-frame labels of each ROI from multiple frames in a sequence of frames to accumulate per-frame detection results. The results may include, for each ROI of each frame, the label and the confidence score. At 325, the system will analyze the aggregated data to determine whether the system has amassed sufficient evidence to classify the image capturing device as obstructed or clear. For example, if a label persists in an ROI over at least a threshold number of consecutive frames, or if at least a threshold percentage of frames captured in a time period are labeled with a consistent label, then the system may determine that enough evidence exists to assign that label to the ROI. Optionally, the system may not consider frames for which the confidence score was below a threshold in its calculation at step 325. If there is not enough evidence to classify the ROI (325: NO), then the system may repeat steps 305-320 for one or more additional image frames until the system has sufficient evidence to assign a classification to the ROI, are input into the obstruction detection module. This aggregation process can help the system avoid designating transient obstructions as persistent obstructions.

If there is enough evidence to assign a label to an ROI (325: YES), then at 330 the system will determine whether to assign a label of clear or obstructed (which may include a sub-label such as translucent or opaque) to the image capture device. According to various embodiments, classifications for subsequent image frames in a series of image frames are analyzed. If a classification for similar regions of interest persists for a minimum number of subsequent image frames, the system may assign the persistent classification to that ROI. If the classification is clear and no obstruction is determined to exist (330: NO), then additional image frames 305 are input into the obstruction detection module and the process continues. If the accumulated results indicate a persistent obstruction (330: YES), the obstruction detection module will thus determine that an obstruction exists within the one or more ROIs and the image capture device is therefore obstructed.

Figure 5:
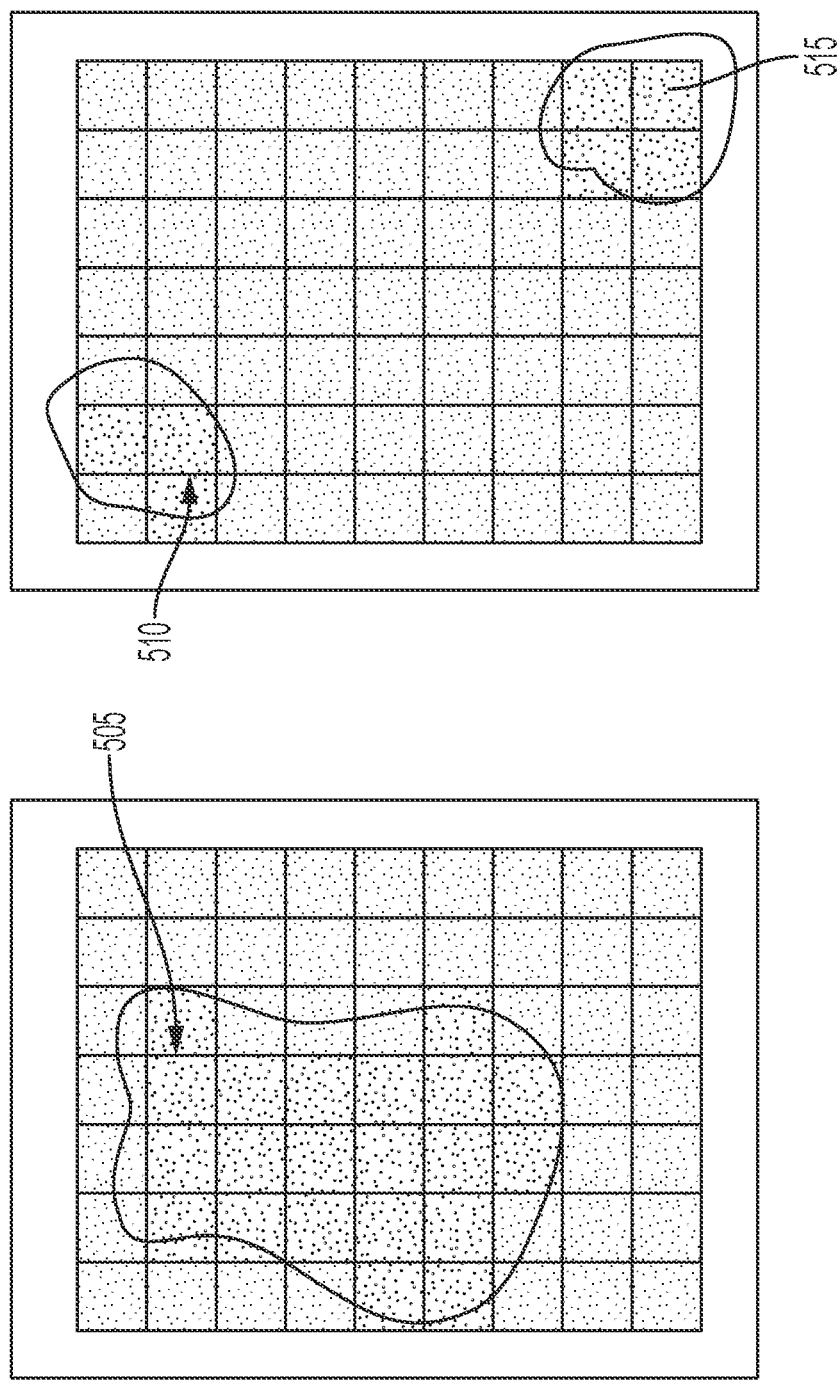
FIG. 5A is an example of an image frame having an obstruction over several ROIs, according to various embodiments of the present disclosure.
FIG. 5B is an example of an image frame having multiple obstructions over several ROIs, according to various embodiments of the present disclosure.

At this point, at 350 the system may generate and transmit a function request to one or more subsystems of the vehicle. Descriptions of possible function requests will be described below. However, before doing so, according to some embodiments, the system may determine a confidence score 335 for the determined obstruction. If the confidence score does not exceed a threshold (335: NO), then the system may rescind the obstruction classification and/or continue to process additional images rather than transmit a function request. According to various embodiments, the system may calculate the confidence score to be a function of the aggregated per-frame uncertainty scores and the number of obstructed ROIs. The function may be an average or mean determination, a normalization of the classifier scores into a probability distribution using a sigmoid function, or another function. A higher number of ROIs classified as having an obstruction, especially in adjacent image frames, will increase the confidence score for the determined obstruction. In addition, obstructions that affect multiple ROIs may increase the confidence of an obstruction classification. In particular, the number of obstruction classifications in spatially connected ROIs can be a direct measure of obstruction strength. For example, as shown in FIG. 5A, a large obstruction area 505 includes multiple spatially connected ROIs, each of which is labeled as having an obstruction present. Due to the multiple spatially connected ROIs, this obstruction area 505 would have increased connectedness and, therefore, a higher confidence that the obstruction is present and/or significant. Conversely, as shown in FIG. 5B, shows less significant obstruction areas 510, 515 which include two smaller clusters of a smaller number of spatially connected ROIs. If there an obstruction persists not only over multiple frames, but also across at least a threshold number of spatially connected ROIs, it can be expected that the obstruction is present. Conversely, scattered obstruction predictions in multiple ROIs may suggest that obstructions are caused by rain droplets or other smaller types of obstruction that will resolve without the need to take action.

Figure 6:
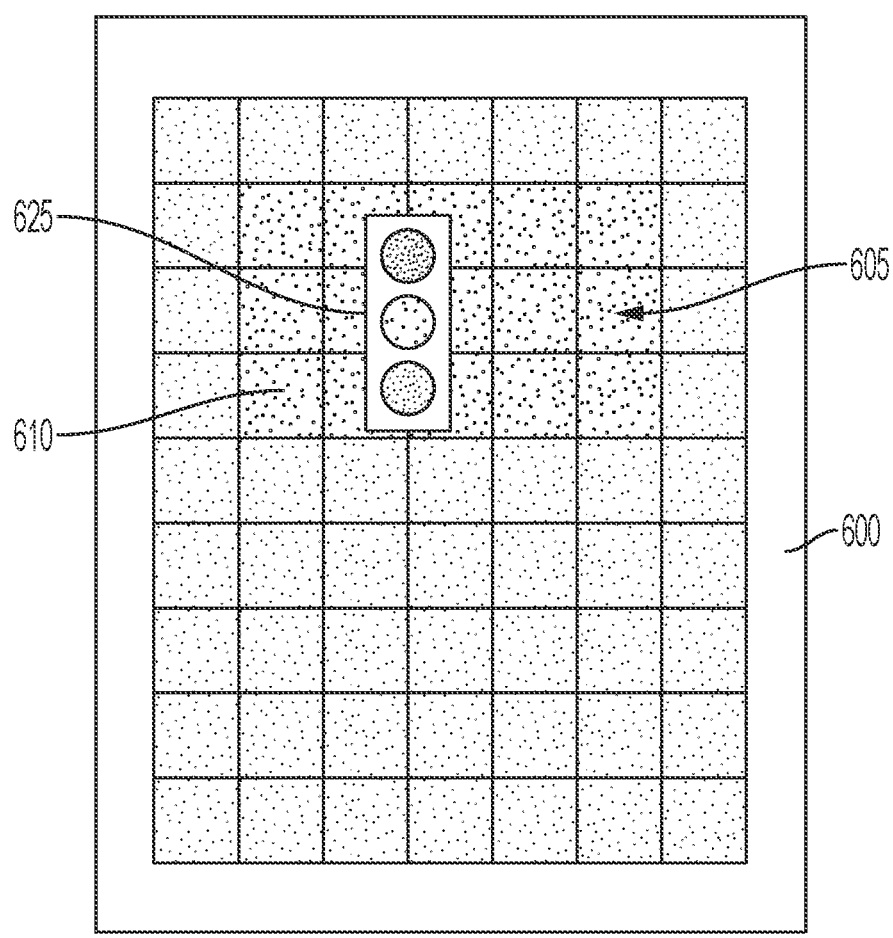
FIG. 6 is an example of an image frame having a set number of ROIs having a higher importance score than other ROIs, according to various embodiments of the present disclosure.

In addition, before generating and transmitting a function request at 350, the system may, at 340, determine whether the obstructed ROIs in the image frame are priority ROIs. For example, some regions of an image may be more likely than others to include information that the system requires to operate. An example of this is shown in FIG. 6. As shown in FIG. 6, the image frame 600 includes a set of ROIs 615. A spatially connected area 605 includes multiple ROIs 610 that are positioned in a location in the upper middle of the frame, which is where the system may expect a traffic signal device 625 to appear when the system encounters it. Thus, the spatially connected area 605 may considered to be in a high priority area. Conversely, referring back to FIG. 5B, area 510 is at a top corner of an image, and it may be considered to be a relatively lower priority area since in most cases that portion of any captured image will simply include the sky and/or features of the environment that are above traffic signals, signs, and objects that the vehicle may encounter. In many vehicles, the image capturing device is mounted such that the sky is almost always imaged in the upper portion of the image. The sky region of the image frame does not usually have sufficient texture for reliable classification. The system may only trigger the function request at 350 if one or more ROIs that are obstructed are priority ROIs.

Optionally, when generating labels at 315 the classifier may label the obstruction not merely as clear or obstructed, but also with a label that identifies one or more physical attributes of the obstruction. For example, the classifier may identify one or more components of the obstruction as water, dirt, leaves, pollen, soot, paint, and/or other classes of material. At 345 before triggering the function request to clean the sensor, the system may use the physical attributes of the obstruction to determine whether the vehicle's cleaning system is capable of removing the obstruction from the image capturing device. If the component class is dirt or leaves and the cleaning system uses air or water to dislodge material from the sensor, then cleaning may be possible (345: YES) and the system may generate a command to clean the sensor at 350. However, if the component class is paint, air and water may not be sufficient to dislodge the paint, so at 360 the system may generate an alternate function request, such as a command to cause the vehicle to move into a parking space, or a command to signal a human operator to take over or augment vehicle operation.

As noted above, if an obstruction is determined to exist within the one or more ROIs at 330, and if any of the other analyses performed at steps 335-345 confirm that a function should be implemented, then at 350 the obstruction detection module will generate function request and transmit the request to an applicable subsystem of the vehicle. The function request may include a command to, for example, cause a cleaning system to a cleaning cycle at the sensor that captured the images, cause a motion planning of the vehicle altering a trajectory and/or speed of the vehicle (such as by moving into a parking space), generating a notification (e.g., a visual and/or audible notification) that an environmental obstruction has been detected, generating a notification (e.g., a visual and/or audible notification) that a function is being performed in response to the detection of an environmental obstruction, and/or perform any other suitable functions.

According to various embodiments, the function request generated at 350 may be a command to cause a cleaning system to clean the image capturing device. According to various embodiments, during and/or subsequent to the cleaning of the image capturing device, at 355 the image capturing device may enter a cool-down phase for a set time frame (e.g., n number of seconds), during which it will not capture images, since the cleaning process will likely interfere with the camera's field of view. Following the cool-down phase, the image capturing device resumes capturing image frames at 305 of the environment within the field of view of the image capturing device and monitoring the frames for obstructions using the processes described above.

Figure 4:
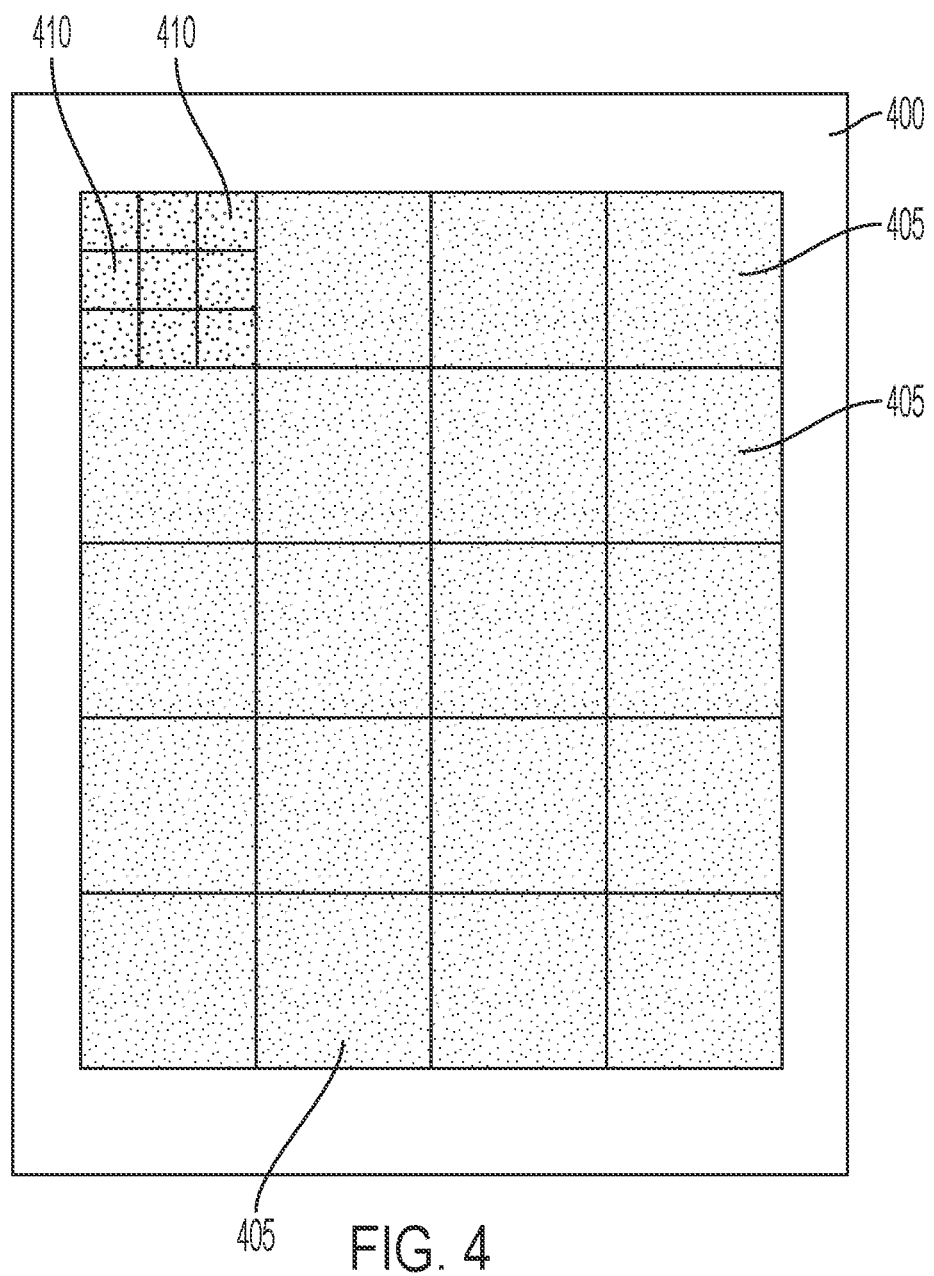
FIG. 4 is an example of an image frame having a non-overlapping grid of regions of interest (ROIs) and sub-ROIs, according to various embodiments of the present disclosure.

As noted above, when the classifier analyzes a frame to look for obstructions in the frame, it will extract obstruction features for each image frame from a non-overlapping grid of ROIs, as shown in FIG. 4. Each ROI 405 of the image frame 400 may be, in turn, split into smaller local regions (sub-ROIs) 410 that the system may analyze to compute statistics of a local filter response. According to various embodiments, except for a sharpness measure (which is derived from the divergence of image gradients), all statistics may be the sub-ROI feature's mean value. The system may aggregate the local responses in the sub-ROIs into a histogram forming the basis of the obstruction detection features.

According to various embodiments, each sub-ROI 410 includes local image features. The local image features, computed at each sub-ROI 410, may include and/or incorporate one or more of the following:

The Log-Laplacian response: The Laplacian is the divergence of the gradient and provides the means to assess the image's energy. The absolute value of the log Laplacian is aggregation over each of the sub-ROIs 410 using the formulae:

$$\sum_x \log|\nabla^2 I(x) + \epsilon|$$

Where the summation variable 'x' is along the sub-ROI 410, and epsilon (E) is a small value to prevent computing the log of zero. The aggregated value over the sub-ROI 415 is the variance.

A red-to-blue ratio given by the formula:

$$\sum_x \frac{R(x) - B(x)}{R(x) + B(x)}$$

where R(x) is the red color value at pixel "x," and B (x) is the blue color value at pixel "x." According to various embodiments, the aggregated value over the sub-ROI 415 is the mean value.

A red-to-blue difference: As with the red-blue ratio, the aggregated value is the mean of:

$$\sum_x R(x) - B(x)$$

The smallest red/green/blue (RGB)-value over the sub-ROI, commonly known as the "dark prior." The dark prior over the sub-ROI is given by:

erode(min(R,G,B))

where "erode' is a morphological erosion over a 3×3 window. The aggregated value over the sub-ROI 410 is the mean value.

The feature vector used in learning an obstruction classifier model is the concatenation of all local histograms in a single feature vector. The choice of these features is motivated by two factors: efficiency and invariant distortions. With efficiency, the features can be extracted efficiently at runtime, which is important due to resource constraints. With the invariant distortions, the local nature of the proposed feature is invariant to geometric distortions in the image. Hence the same set of features can be used with low-distortion and high-distortion (fisheye) lenses alike.

According to various embodiments, the system may use machine learning to train the classifier during implementation, and also to update the model as additional data is received. The learning process may include (1) implementing an initial classifications model, and (2) re-fitting the initial classifications model using the most critical feature coordinates.

To implementing the initiations model, the dataset is labeled per ROI, indicating the type of camera obstruction: clear, translucent, and opaque. The classification algorithm's choice is essential as image-degradations caused by real-world obstructions are rare events that are hard to obtain at a large scale. According to various embodiments, the system may implement the Logistics Regressions (LogReg) algorithm. As a linear classifier, LogReg is simple to train and can generalize well from a small set of labeled examples. Training the classifier can be done using traditional techniques in a one-vs-many fashion.

After an initial model is trained, model weights are used to re-derive the feature vector, where only the most crucial feature coordinates are retained. According to various embodiments, the feature vector's final size is selected to be a multiple of 16 for maximum runtime classifier efficiency as the feature vector can fit directly in Single Instruction, Multiple Data (SIMD) registers. It is noted, however, that the feature vector can include any suitable final size.

According to various embodiments, each image frame includes classification outputs. For each image frame, the classification outputs, per ROI, include a model score (the distance of the feature vector from a separating hyperplane of every class), a model confidence (obtained by normalizing the classifier scores into a probability distribution using the Sigmoid function), and a most likely class (either "clear," "translucent," or "obstructed," based on the highest classifier score per class).

According to various embodiments, the ROIs are processed through an additional classification step. The primary purpose of the additional classification step is to endow the system with the ability to handle false positive transient degradations of image quality. The most prominent example of such transient degradation includes changes in the image intensity due to auto-exposure.

According to various embodiments, the per-frame obstruction classifier model produces outputs which are aggregated over time, per ROI, and used as the basis for a binary obstruction status classifier. The multi-class LogReg classifier model scores (the distances from the classification hyperplane) are aggregated, per ROI, using a weighted sum of the score and confidence. For example, if there are 20 ROIs, then the aggregated feature vector size would be 60, i.e., three classes multiplied by 20 ROIs. The same classification algorithm (LogReg) may be used to train a binary classifier indicating obstruction status.

Figure 7:
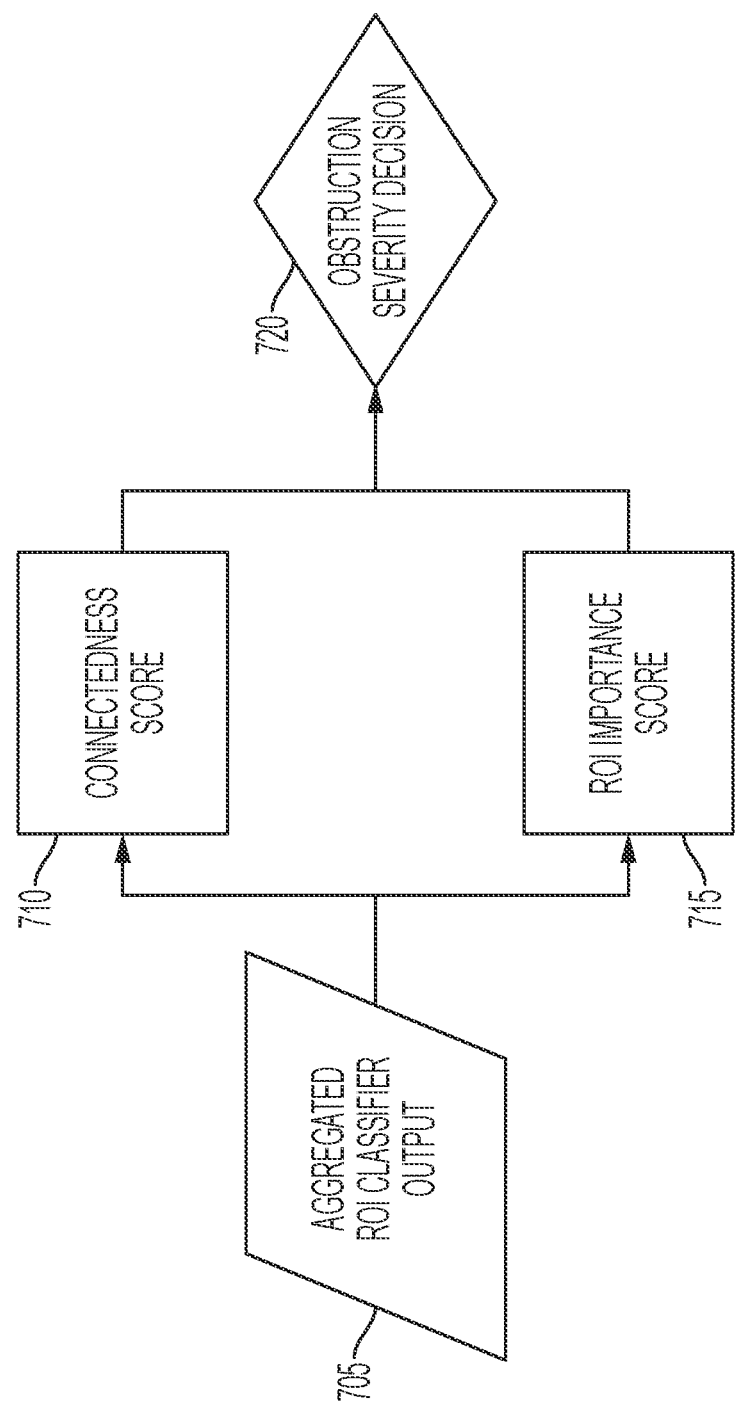
FIG. 7 is a summary of prediction confidence based on ROI contributions, according to various embodiments of the present disclosure.

FIG. 7 illustrates a summary of prediction confidence based on ROI contributions. The combination of elements and thresholds may be used to determine the latency of obstruction classification.

According to various embodiments, the aggregated ROI classifier output 705 (as described in reference to FIG. 3) is analyzed to determine a connectedness score 710 between ROIs in the image frame at which an obstruction has been determined, and an ROI importance score 715 of the ROIs in the image frame at which the obstruction has been determined. The connectedness score 710 and the ROI importance score 715 are used by the obstruction detection module to decide a severity level of the obstruction. Based on the severity level of the obstruction, the system is configured to perform the one or more functions.

Figure 8:
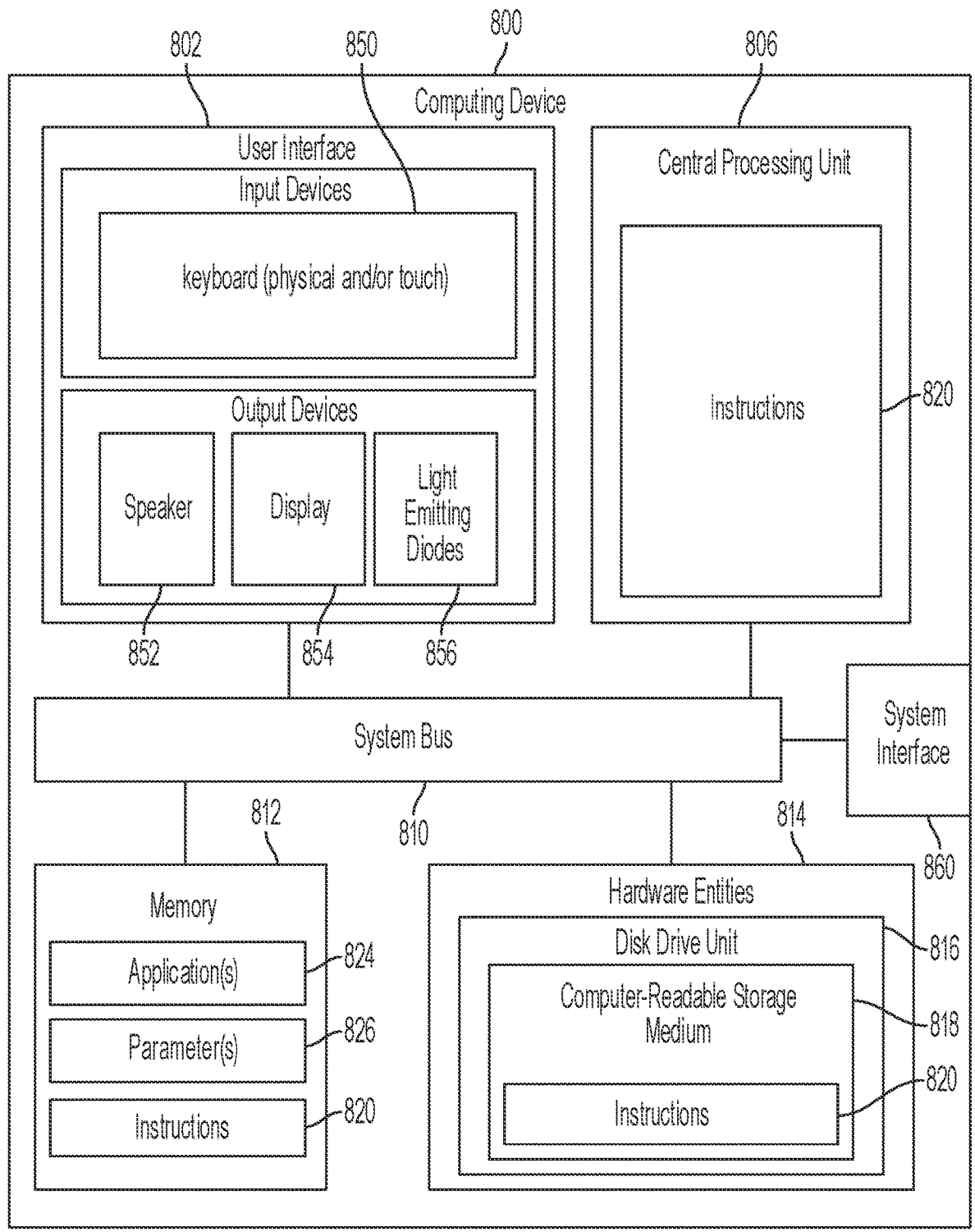
FIG. 8 is an illustration of various elements of an example computing device, in accordance with the present disclosure.

Referring now to FIG. 8, an illustration of an illustrative architecture for a computing device 800 is provided. The computing device 120 of FIG. 1 is the same as or similar to computing device 800. As such, the discussion of computing device 800 is sufficient for understanding the computing device 120 of FIG. 1.

Computing device 800 may include more or less components than those shown in FIG. 1. However, the components shown are sufficient to disclose an illustrative solution implementing the present solution. The hardware architecture of FIG. 8 represents one implementation of a representative computing device configured to one or more methods and means for identifying image capturing device obstructions, as described herein. As such, the computing device 800 of FIG. 8 implements at least a portion of the method(s) described herein.

Some or all components of the computing device 800 can be implemented as hardware, software and/or a combination of hardware and software. The hardware includes, but is not limited to, one or more electronic circuits. The electronic circuits can include, but are not limited to, passive components (e.g., resistors and capacitors) and/or active components (e.g., amplifiers and/or microprocessors). The passive and/or active components can be adapted to, arranged to and/or programmed to perform one or more of the methodologies, procedures, or functions described herein.

As shown in FIG. 8, the computing device 800 comprises a user interface 802, a Central Processing Unit (CPU) 806, a system bus 810, a memory 812 connected to and accessible by other portions of computing device 800 through system bus 810, a system interface 860, and hardware entities 814 connected to system bus 810. The user interface 802 can include input devices and output devices, which facilitate user-software interactions for controlling operations of the computing device 800. The input devices include, but are not limited to, a physical and/or touch keyboard 850. The input devices can be connected to the computing device 800 via a wired or wireless connection (e.g., a Bluetooth® connection). The output devices include, but are not limited to, a speaker 852, a display 854, and/or light emitting diodes 856. System interface 860 is configured to facilitate wired or wireless communications to and from external devices (e.g., network nodes such as access points, etc.).

At least some of the hardware entities 814 perform actions involving access to and use of memory 812, which can be a random access memory ("RAM"), a disk drive, flash memory, a compact disc read only memory ("CD-ROM") and/or another hardware device that is capable of storing instructions and data. Hardware entities 814 can include a disk drive unit 816 comprising a computer-readable storage medium 818 on which is stored one or more sets of instructions 820 (e.g., software code) configured to implement one or more of the methodologies, procedures, or functions described herein. The instructions 820 can also reside, completely or at least partially, within the memory 812 and/or within the CPU 806 during execution thereof by the computing device 800. The memory 812 and the CPU 806 also can constitute machine-readable media. The term "machine-readable media", as used here, refers to a single medium or multiple media (e.g., a centralized or distributed database, and/or associated caches and servers) that store the one or more sets of instructions 820. The term "machine-readable media", as used here, also refers to any medium that is capable of storing, encoding or carrying a set of instructions 820 for execution by the computing device 800 and that cause the computing device 800 to perform any one or more of the methodologies of the present disclosure.

Figure 9:
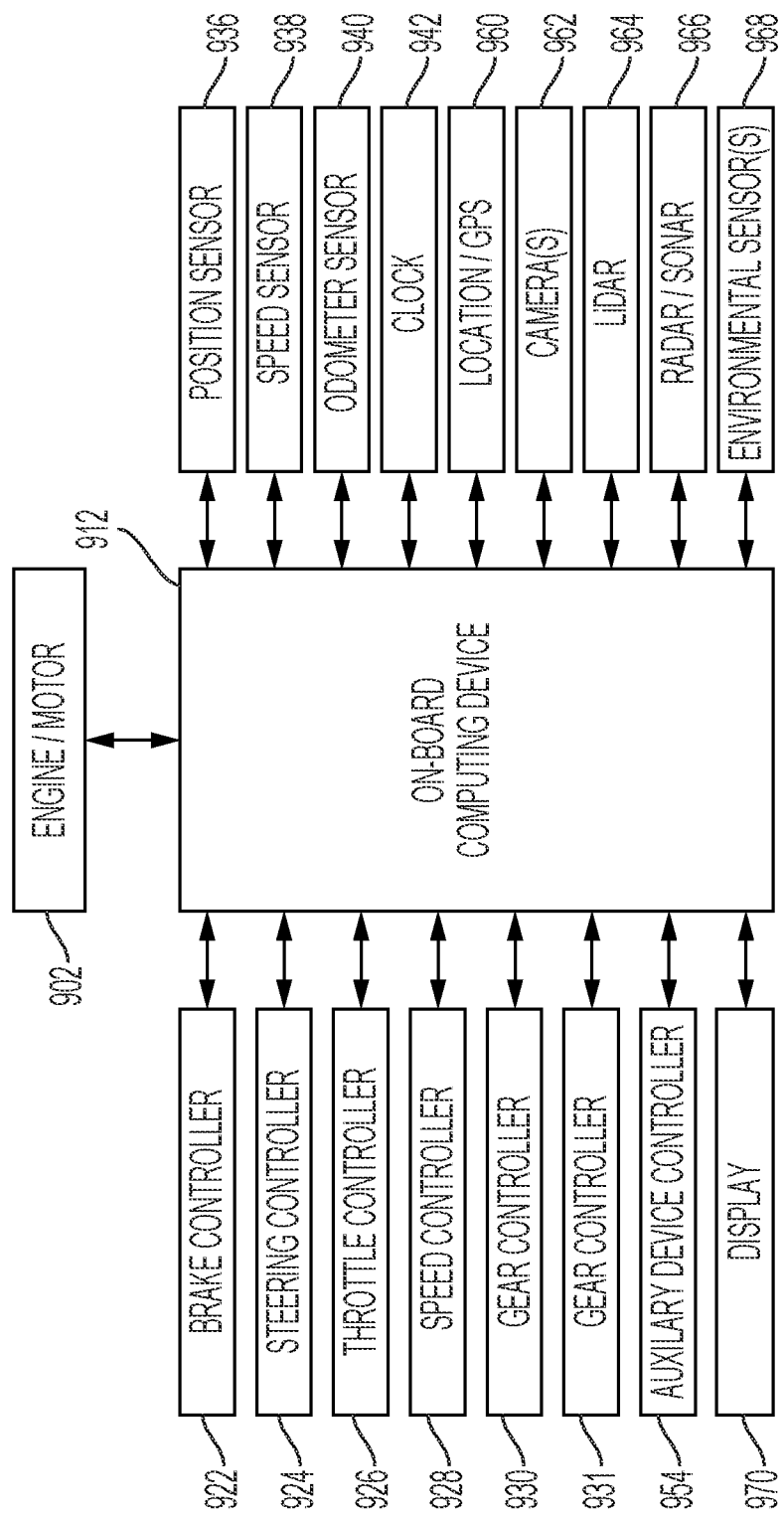
FIG. 9 illustrates example elements of an autonomous vehicle, in accordance with various embodiments of the present disclosure.

FIG. 9 illustrates an example system architecture for a vehicle 901, such as vehicle 105 of FIG. 1. The vehicle 901 may include an engine or motor 902 and various sensors for measuring various parameters of the vehicle and/or its environment. Operational parameter sensors that are common to both types of vehicles include, for example: a position sensor 936 such as an accelerometer, gyroscope and/or inertial measurement unit; a speed sensor 938; and an odometer sensor 940. The vehicle 901 also may have a clock 942 that the system architecture uses to determine vehicle time during operation. The clock 942 may be encoded into the vehicle on-board computing device 912. It may be a separate device, or multiple clocks may be available. The computing device 120 of FIG. 1 and/or computing device 800 of FIG. 8 is the same as or similar to computing device 912.

The vehicle 901 also may include various sensors that operate to gather information about the environment in which the vehicle is traveling. These sensors may include, for example: a location sensor 960 such as a global positioning system (GPS) device; object detection sensors such as one or more cameras 962; a LiDAR sensor system 964; and/or a radar and or and/or a sonar system 968. The sensors also may include environmental sensors 968 such as a precipitation sensor and/or ambient temperature sensor. The object detection sensors may enable the vehicle 901 to detect objects that are within a given distance or range of the vehicle 901 in any direction, while the environmental sensors collect data about environmental conditions within the vehicle's area of travel. The system architecture will also include one or more cameras 962 for capturing images of the environment. Any or all of these sensors will capture sensor data that will enable one or more processors of the vehicle's on-board computing device 912 and/or external devices to execute programming instructions that enable the computing system to classify objects in the perception data, and all such sensors, processors and instructions may be considered to be the vehicle's perception system. The vehicle also may receive information from a communication device (such as a transceiver, a beacon and/or a smart phone) via one or more wireless communication links, such as those known as vehicle-to-vehicle, vehicle-to-object or other V2X communication links. The term "V2X" refers to a communication between a vehicle and any object that the vehicle that may encounter or affect in its environment.

During operations, information is communicated from the sensors to an on-board computing device 912. The on-board computing device 912 analyzes the data captured by the sensors and optionally controls operations of the vehicle based on results of the analysis. For example, the on-board computing device 912 may control braking via a brake controller 922; direction via a steering controller 924; speed and acceleration via a throttle controller 926 (in a gas-powered vehicle) or a motor speed controller 928 (such as a current level controller in an electric vehicle); a differential gear controller 930 (in vehicles with transmissions); and/or other controllers such as an auxiliary device controller 954.

Geographic location information may be communicated from the location sensor 960 to the on-board computing device 912, which may then access a map of the environment that corresponds to the location information to determine known fixed features of the environment such as streets, buildings, traffic lights, stop signs and/or stop/go signals. Captured images from the cameras 962 and/or object detection information captured from sensors such as a LiDAR system 964 is communicated from those sensors to the on-board computing device 912. The object detection information and/or captured images may be processed by the on-board computing device 912 to detect objects in proximity to the vehicle 901. In addition or alternatively, the vehicle 901 may transmit any of the data to a remote server system 140 (FIG. 1) for processing. Any known or to be known technique for making an object detection based on sensor data and/or captured images can be used in the embodiments disclosed in this document.

In addition, the autonomous vehicle 901 may include an onboard display device (not shown here) that may generate and output interface on which sensor data, vehicle status information, or outputs generated by the processes described in this document (e.g., various maps and routing information) are displayed to an occupant of the vehicle. The display device may include, or a separate device may be, an audio speaker that presents such information in audio format.

The on-board computing device 912 may obtain, retrieve, and/or create map data that provides detailed information about the surrounding environment of the autonomous vehicle 901. The on-board computing device 912 may also determine the location, orientation, pose, etc. of the AV in the environment (localization) based on, for example, three dimensional position data (e.g., data from a GPS), three dimensional orientation data, predicted locations, or the like. For example, the on-board computing device 912 may receive GPS data to determine the AV's latitude, longitude and/or altitude position. Other location sensors or systems such as laser-based localization systems, inertial-aided GPS, or camera-based localization may also be used to identify the location of the vehicle. The location of the vehicle may include an absolute geographical location, such as latitude, longitude, and altitude as well as relative location information, such as location relative to other cars immediately around it which can often be determined with less noise than absolute geographical location. The map data can provide information regarding: the identity and location of different roadways, road segments, lane segments, buildings, or other items; the location, boundaries, and directions of traffic lanes (e.g., the location and direction of a parking lane, a turning lane, a bicycle lane, or other lanes within a particular roadway) and metadata associated with traffic lanes; traffic control data (e.g., the location and instructions of signage, traffic lights, or other traffic control devices); and/or any other map data that provides information that assists the on-board computing device 912 in analyzing the surrounding environment of the autonomous vehicle 901.

In certain embodiments, the map data may also include reference path information that correspond to common patterns of vehicle travel along one or more lanes such that the motion of the object is constrained to the reference path (e.g., locations within traffic lanes on which an object commonly travels). Such reference paths may be pre-defined such as the centerline of the traffic lanes. Optionally, the reference path may be generated based on historical observations of vehicles or other objects over a period of time (e.g., reference paths for straight line travel, lane merge, a turn, or the like).

In certain embodiments, the on-board computing device 912 may also include and/or may receive information relating to the trip or route of a user, real-time traffic information on the route, or the like.

The on-board computing device 912 may include and/or may be in communication with a routing controller 931 that generates a navigation route from a start position to a destination position for an autonomous vehicle 901. The routing controller 931 may access a map data store to identify possible routes and road segments that a vehicle can travel on to get from the start position to the destination position. The routing controller 931 may score the possible routes and identify a preferred route to reach the destination. For example, the routing controller 931 may generate a navigation route that minimizes Euclidean distance traveled or other cost function during the route, and may further access the traffic information and/or estimates that can affect an amount of time it will take to travel on a particular route. Depending on implementation, the routing controller 931 may generate one or more routes using various routing methods, such as Dijkstra's algorithm, Bellman-Ford algorithm, or other algorithms. The routing controller 931 may also use the traffic information to generate a navigation route that reflects expected conditions of the route (e.g., current day of the week or current time of day, etc.), such that a route generated for travel during rush-hour may differ from a route generated for travel late at night. The routing controller 931 may also generate more than one navigation route to a destination and send more than one of these navigation routes to a user for selection by the user from among various possible routes.

In various embodiments, an on-board computing device 912 may determine perception information of the surrounding environment of the autonomous vehicle 901. Based on the sensor data provided by one or more sensors and location information that is obtained, the on-board computing device 912 may determine perception information of the surrounding environment of the autonomous vehicle 901. The perception information may represent what an ordinary driver would perceive in the surrounding environment of a vehicle.

The perception data may include information relating to one or more objects in the environment of the autonomous vehicle 901. For example, the on-board computing device 912 may process sensor data (e.g., LiDAR or RADAR data, camera images, etc.) in order to identify objects and/or features in the environment of autonomous vehicle 901. The objects may include traffic signals, roadway boundaries, other vehicles, pedestrians, and/or obstacles, etc. The on-board computing device 912 may use any now or hereafter known object recognition algorithms, video tracking algorithms, and computer vision algorithms (e.g., track objects frame-to-frame iteratively over a number of time periods) to determine the perception.

In some embodiments, the on-board computing device 912 may also determine, for one or more identified objects in the environment, the current state of the object. The state information may include, without limitation, for each object: current location; current speed and/or acceleration, current heading; current pose; current shape, size, or footprint; type (e.g., vehicle vs. pedestrian vs. bicycle vs. static object or obstacle); and/or other state information.

The on-board computing device 912 may perform one or more prediction and/or forecasting operations. For example, the on-board computing device 912 may predict future locations, trajectories, and/or actions of one or more objects. For example, the on-board computing device 912 may predict the future locations, trajectories, and/or actions of the objects based at least in part on perception information (e.g., the state data for each object comprising an estimated shape and pose determined as discussed below), location information, sensor data, and/or any other data that describes the past and/or current state of the objects, the autonomous vehicle 901, the surrounding environment, and/or their relationship(s). For example, if an object is a vehicle and the current driving environment includes an intersection, the on-board computing device 912 may predict whether the object will likely move straight forward or execute a turn. If the perception data indicates that the intersection has no traffic light, the on-board computing device 912 may also predict whether the vehicle may have to fully stop prior to enter the intersection.

In various embodiments, the on-board computing device 912 may determine a motion plan for the autonomous vehicle. For example, the on-board computing device 912 may determine a motion plan for the autonomous vehicle based on the perception data and/or the prediction data. Specifically, given predictions about the future locations of proximate objects and other perception data, the on-board computing device 912 can determine a motion plan for the autonomous vehicle 901 that best navigates the autonomous vehicle relative to the objects at their future locations.

In one or more embodiments, the on-board computing device 912 may receive predictions and decide how to handle objects and/or actors in the environment of the autonomous vehicle 901. For example, for a particular actor (e.g., a vehicle with a given speed, direction, turning angle, etc.), the on-board computing device 912 decides whether to overtake, yield, stop, and/or pass based on, for example, traffic conditions, map data, state of the autonomous vehicle, etc. Furthermore, the on-board computing device 912 also plans a path for the autonomous vehicle 901 to travel on a given route, as well as driving parameters (e.g., distance, speed, and/or turning angle). That is, for a given object, the on-board computing device 912 decides what to do with the object and determines how to do it. For example, for a given object, the on-board computing device 912 may decide to pass the object and may determine whether to pass on the left side or right side of the object (including motion parameters such as speed). The on-board computing device 912 may also assess the risk of a collision between a detected object and the autonomous vehicle 901. If the risk exceeds an acceptable threshold, it may determine whether the collision can be avoided if the autonomous vehicle follows a defined vehicle trajectory and/or implements one or more dynamically generated emergency maneuvers is performed in a pre-defined time period (e.g., N milliseconds). If the collision can be avoided, then the on-board computing device 912 may execute one or more control instructions to perform a cautious maneuver (e.g., mildly slow down, accelerate, change lane, or swerve). In contrast, if the collision cannot be avoided, then the on-board computing device 912 may execute one or more control instructions for execution of an emergency maneuver (e.g., brake and/or change direction of travel).

As discussed above, planning and control data regarding the movement of the autonomous vehicle is generated for execution. The on-board computing device 912 may, for example, control braking via a brake controller; direction via a steering controller; speed and acceleration via a throttle controller (in a gas-powered vehicle) or a motor speed controller (such as a current level controller in an electric vehicle); a differential gear controller (in vehicles with transmissions); and/or other controllers.

Although the present solution has been illustrated and described with respect to one or more implementations, equivalent alterations and modifications will occur to others skilled in the art upon the reading and understanding of this specification and the annexed drawings. In addition, while a particular feature of the present solution may have been disclosed with respect to only one of several implementations, such feature may be combined with one or more other features of the other implementations as may be desired and advantageous for any given or particular application. Thus, the breadth and scope of the present solution should not be limited by any of the above described embodiments. Rather, the scope of the present solution should be defined in accordance with the following claims and their equivalents.

The invention claimed is:

1. A method of identifying and classifying an obstruction in a field of view of an image capturing device, the method comprising, by a processor:
  receiving a first sequence of image frames, wherein each image frame represents a field of view of an image capturing device;
  for each of the image frames in the first sequence:
    segmenting the image frame into a plurality of regions of interest (ROIs), and
    using a classifier to assign a classification to each ROI, wherein the classification indicates whether the ROI is clear or obstructed;
  aggregating the classifications for each ROI to determine an aggregate classification for each ROI; and
  in response to an obstructed classification persisting for a threshold number of image frames:
    classifying the image capturing device as obstructed, and
    generating a function request that, when executed, will cause a system of which the image capturing device is a component to perform a function.

2. The method of claim 1, wherein the function request includes one or more of the following:
- a command to trigger a cleaning cycle that will cause a cleaning system to direct air or water toward the image capturing device to clean the image capturing device; or
- a command to trigger a cleaning cycle that will cause a cleaning system to wipe image capturing device to clean the image capturing device.

3. The method of claim 1, wherein:
the image capturing device is a component of an autonomous vehicle; and
the function request comprises a command to perform one or more of the following:
- cause a motion planning system of the autonomous vehicle to move to a parking location, or
- alert a human operator to take over operation of the autonomous vehicle.

4. The method of claim 1, further comprising:
generating a confidence score for the aggregate classification; and
classifying the image capturing device as obstructed and generating the function request is also responsive to the confidence score for the aggregate classification exceeding a threshold.

5. The method of claim 4, wherein generating the confidence score comprises generating a score that is a function of one or more of the following:
- a number of the image frames in the sequence in which the obstruction was detected; a number of spatially adjacent ROIs that were classified as obstructed; or
- a location within the image frames at which obstructed ROIs were positioned.

6. The method of claim 1, wherein classifying the image capturing device as obstructed also comprises classifying an obstruction in the image frames as either a translucent obstruction or an opaque obstruction.

7. The method of claim 1, further comprising, for each of the image frames in the first sequence:
- using the classifier to assign an obstruction type to each ROI which the classifier identifies as obstructed; and
- when generating the function request, selecting a command that corresponds to the obstruction type, and including the selected command in the function request.

8. The method of claim 1, further comprising, when the region of interest for the series of image frames is not classified as an obstruction:
- continuing to receive additional image frames, segment each additional image frame into additional ROIs, use the classifier to assign an additional classification to each additional ROI, and aggregate the additional classifications until an obstructed classification persists for the threshold number of image frames.

9. A system, comprising:
one or more image capturing devices; and
a computing device that includes a processor and memory, wherein the memory includes instructions that, when executed by the processor, will cause the processor to:
- receive a first sequence of image frames, wherein each image frame represents a field of view of an image capturing device,
- for each of the image frames in the first sequence:
  - segment the image frame into a plurality of regions of interest (ROIs), and
  - use a classifier to assign a classification to each ROI, wherein the classification indicates whether the ROI is clear or obstructed,
- aggregate the classifications for each ROI to determine an aggregate classification for each ROI, and
- in response to an obstructed classification persisting for a threshold number of image frames:
  - classify the image capturing device as obstructed, and
  - generate a function request that, when executed, will cause a system of which the image capturing device is a component to perform a function, wherein the instructions to generate the function request comprise instructions to generate one or more of the following:
- a command to trigger a cleaning cycle that will cause a cleaning system to direct air or water toward the image capturing device to clean the image capturing device; or
- a command to trigger a cleaning cycle that will cause a cleaning system to wipe image capturing device to clean the image capturing device.

10. The system of claim 9, wherein:
the system is integral with an autonomous vehicle;
the image capturing device is a component of the autonomous vehicle; and
the instructions to generate the function request comprise instructions to generate a command to perform one or more of the following:
- cause a motion planning system of the autonomous vehicle to move to a parking location, or
- alert a human operator to take over operation of the autonomous vehicle.

11. The system of claim 9:
further comprising additional instructions that, when executed by the processor, will cause the processor to generate a confidence score for the aggregate classification, and
wherein the instructions to classify the image capturing device as obstructed are also configured to do so responsive to the confidence score for the aggregate classification exceeding a threshold.

12. The system of claim 11, wherein the instructions to generate the confidence score comprise instructions to generate a score that is a function of one or more of the following:
- a number of the image frames in the sequence in which the obstruction was detected; a number of spatially adjacent ROIs that were classified as obstructed; or
- a location within the image frames at which obstructed ROIs were positioned.

13. The system of claim 9, wherein the instructions to classify the image capturing device as obstructed also comprise instructions to classify an obstruction in the image frames as either a translucent obstruction or an opaque obstruction.

14. The system of claim 9, further comprising additional instructions to, for each of the image frames in the first sequence:
- use the classifier to assign an obstruction type to each ROI which the classifier identifies as obstructed; and
- when generating the function request, select a command that corresponds to the obstruction type, and include the selected command in the function request.

15. The system of claim 9, further comprising additional instructions to, in response to the region of interest for the series of image frames not being classified as an obstruction:
- receive additional image frames;
- segment each additional image frame into additional ROIs;
- use the classifier to assign an additional classification to each additional ROI; and aggregate the additional classifications until an obstructed classification persists for the threshold number of image frames.

16. The system of claim 9, wherein the instructions to classify the image capturing device as obstructed also comprise instructions to classify an obstruction in the image frames as either a translucent obstruction or an opaque obstruction.

17. A computer program product comprising a non-transitory computer-readable medium that includes programming instructions that, when executed by a processor, will cause the processor to:
- receive a first sequence of image frames, wherein each image frame represents a field of view of an image capturing device;
- for each of the image frames in the first sequence:
  - segment the image frame into a plurality of regions of interest (ROIs), and
  - use a classifier to assign a classification to each ROI, wherein the classification indicates whether the ROI is clear or obstructed,
- aggregate the classifications for each ROI to determine an aggregate classification for each ROI;
- generate a confidence score for the aggregate classification and
- in response to an obstructed classification persisting for a threshold number of image frames:
  - classify the image capturing device as obstructed, and
  - generate a function request that, when executed, will cause a system of which the image capturing device is a component to perform a function,
- wherein the instructions to classify the image capturing device as obstructed are also configured to do so responsive to the confidence score for the aggregate classification exceeding a threshold.

18. The computer program product of claim 17, wherein the instructions to generate the function request comprise instructions to generate one or more of the following:
- a command to trigger a cleaning cycle that will cause a cleaning system to direct air or water toward the image capturing device to clean the image capturing device; or
- a command to trigger a cleaning cycle that will cause a cleaning system to wipe image capturing device to clean the image capturing device.

* * * * *